United States Patent
Gipp et al.

(10) Patent No.: US 9,384,205 B1
(45) Date of Patent: Jul. 5, 2016

(54) AUTO ADAPTIVE DEDUPLICATION TO CLOUD BASED STORAGE

(71) Applicant: Veritas Technologies LLC, Mountain View, CA (US)

(72) Inventors: Stephan Gipp, St. Louis Park, MN (US); Jeremy Wartnick, Minnetonka, MN (US)

(73) Assignee: Veritas Technologies LLC, Mountain View, CA (US)

( * ) Notice: Subject to any disclaimer, the term of this patent is extended or adjusted under 35 U.S.C. 154(b) by 139 days.

(21) Appl. No.: 14/133,212

(22) Filed: Dec. 18, 2013

(51) Int. Cl.
*G06F 17/30* (2006.01)
*G06F 3/06* (2006.01)

(52) U.S. Cl.
CPC .... *G06F 17/30156* (2013.01); *G06F 17/30109* (2013.01); *G06F 3/0608* (2013.01); *G06F 3/0641* (2013.01); *G06F 17/3015* (2013.01); *G06F 17/30159* (2013.01); *G06F 17/30424* (2013.01)

(58) Field of Classification Search
CPC ............ G06F 3/0608; G06F 17/30156; G06F 17/30159; G06F 17/30424; G06F 3/0641; G06F 17/30109; G06F 17/3015
USPC .......................................................... 707/692
See application file for complete search history.

(56) References Cited

U.S. PATENT DOCUMENTS

| | | | | |
|---|---|---|---|---|
| 8,161,180 B1* | 4/2012 | Swift | ...................... | H04L 45/24 370/389 |
| 8,200,923 B1* | 6/2012 | Healey | ................. | G06F 11/1453 711/108 |
| 8,315,985 B1* | 11/2012 | Ohr | ...................... | G06F 11/1453 707/664 |
| 8,315,992 B1* | 11/2012 | Gipp | .................... | G06F 11/1453 707/692 |
| 8,340,039 B2* | 12/2012 | Akirav | .............. | G06F 17/30943 370/329 |
| 8,688,651 B2* | 4/2014 | Kennedy | ............. | G06F 11/1453 707/692 |
| 8,849,955 B2* | 9/2014 | Prahlad | ............... | G06F 17/3002 709/211 |
| 8,891,473 B2* | 11/2014 | Akirav | .............. | G06F 17/30943 370/329 |
| 8,983,968 B2* | 3/2015 | Zhu | ...................... | G06F 17/3015 707/747 |
| 9,047,301 B2* | 6/2015 | Petrocelli | ............... | G06F 3/0608 |
| 2010/0208591 A1* | 8/2010 | Corliano | ................. | H04L 47/10 370/237 |
| 2010/0332401 A1* | 12/2010 | Prahlad | ............... | G06F 17/3002 705/80 |
| 2011/0216648 A1* | 9/2011 | Mehrotra | ................ | H04L 47/30 370/230 |
| 2011/0219287 A1* | 9/2011 | Srinivas | .................. | G06F 11/10 714/781 |
| 2013/0080409 A1* | 3/2013 | Akirav | .............. | G06F 17/30943 707/692 |
| 2014/0006354 A1* | 1/2014 | Parkison | ........... | G06F 17/30194 707/649 |
| 2014/0007239 A1* | 1/2014 | Sharpe | .................. | G06F 21/561 726/24 |
| 2014/0358870 A1* | 12/2014 | Chambliss | ........ | G06F 17/30156 707/692 |

OTHER PUBLICATIONS

The Taneja Group, Inc., Matching Data Deduplication Approaches to Workload Characteristics: The Quantum DXi7500., Dec. 2008.

* cited by examiner

*Primary Examiner* — Thanh-Ha Dang
(74) *Attorney, Agent, or Firm* — Rory D. Rankin; Meyertons, Hood, Kivlin, Kowert & Goetzel, P.C.

(57) ABSTRACT

A computer-implemented method for managing an inline deduplication module is described. Congestion information is collected about a level of congestion on a network that communicates with an inline deduplication module. An instruction is sent to the inline deduplication module to adjust a deduplication rate based at least in part on the congestion information.

15 Claims, 9 Drawing Sheets

AUTO ADAPTIVE DEDUPLICATION TO CLOUD BASED STORAGE

BACKGROUND

Many organizations use one or more computer networks to communicate and share data between the various computers connected to the networks. On-premise computing devices of the organization may communicate through a local area network (LAN). If the organization has a significant amount of data to store, the organization may use a storage area network (SAN) to store data outside of the local area network. A SAN is a dedicated network that provides access to consolidated, block level data storage. A SAN typically has its own network of storage devices that are generally not accessible through the organization's LAN. A SAN can be located locally on the premise of the organization's network. However, the SAN is more commonly located at a remote site, such as a data center where multiple organizations can store their organization's data.

Each organization can transfer data from their on-premise devices to the SANs through existing communication channels, which can be used by multiple organizations simultaneously. The SAN keeps data from different organizations separate and prevents unauthorized users from accessing the data. The SANs can provide a significant cost reduction to users by reducing or eliminating the costs associated with storing data at on-premise devices.

SUMMARY

A computer-implemented method for managing an inline deduplication module is described. Congestion information is collected about a level of congestion on a network that communicates with an inline deduplication module. An instruction is sent to the inline deduplication module to adjust a deduplication rate based at least in part on the congestion information. The network may be a cloud based storage network.

In one example, the instruction includes a command for the inline deduplication module to increase a search time to look for a data segment. In other examples, the instruction includes an command for the inline deduplication module to decrease a search time to look for a data segment signature, to decrease a number of transaction counts associated with looking for a data segment signature, and/or to increase a number of transaction counts associated with looking for a data segment signature.

In one embodiment, collecting the congestion information about a level of congestion includes collecting the congestion information from on-premise devices that are sending data through the inline deduplication module over a communication channel. The communication channel can be independent of the network about which the network congestion information is being collected. The congestion information can include a count of the on-premise devices that are utilizing the network, classifications of on premise devices using the network, priorities, types of transfers, types of resources used, a wait time for data to be pushed through the network, other types of information, or combinations thereof.

A computing device configured to manage an inline deduplication module is also described. The computing device may include a processor and memory in electronic communication with the processor. The device may further include a managing module configured to collect congestion information about a level of congestion on a network that communicates with an inline deduplication module and to send an instruction to the inline deduplication module to adjust a deduplication rate based at least in part on the congestion information.

A computer-program product for managing an inline deduplication module is also described. The computer-program product may include a computer-readable medium having instructions thereon. The instructions may include code programmed to collect congestion information about a level of congestion on a network that communicates with an inline deduplication module and code programmed to send an instruction to the inline deduplication module to adjust a deduplication rate based at least in part on the congestion information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
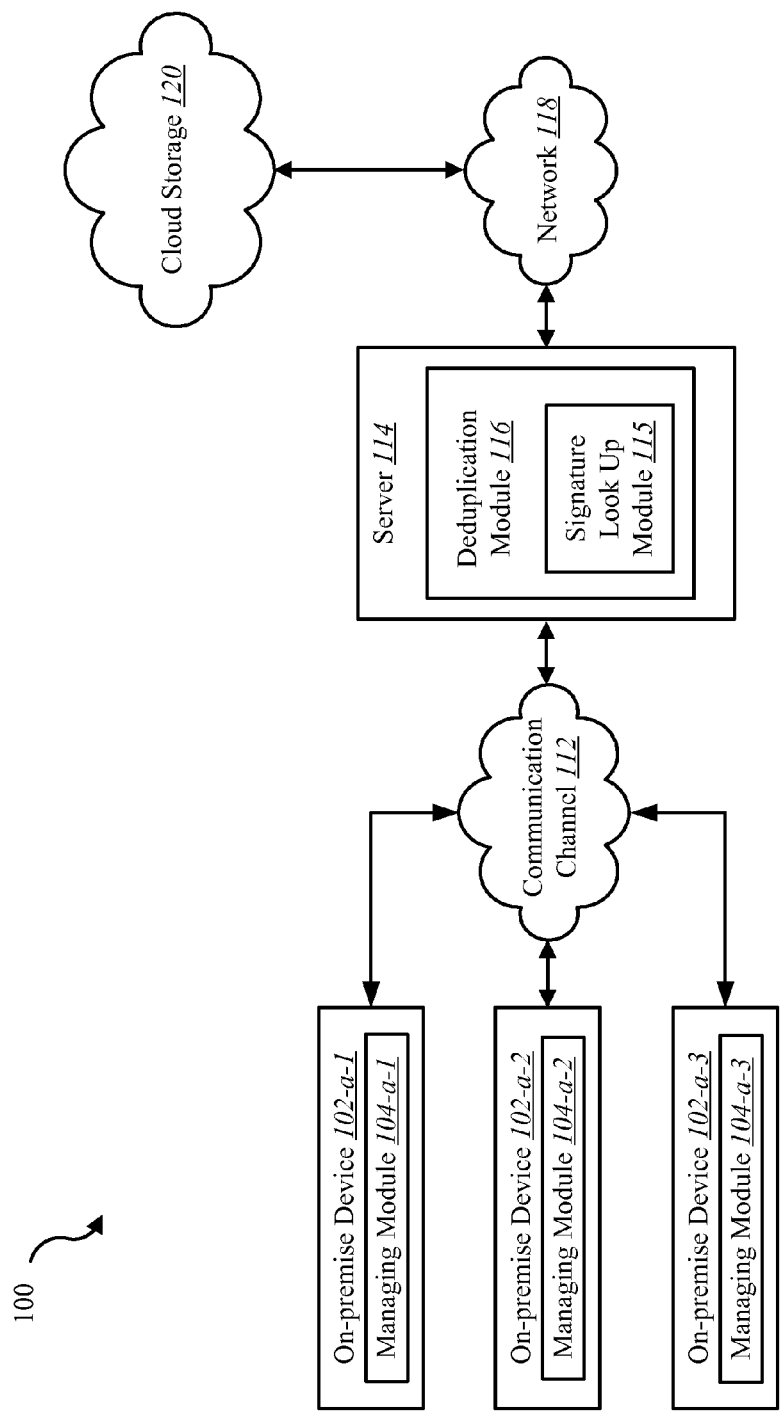
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The quality of service provided by the SAN can be impacted by varying levels of data traffic on the SAN. Further, unexpected network usage levels from one network user may cause performance to decrease for other users on the same network. In computing systems, data deduplication may refer to a specialized data compression technique for eliminating redundant data. By reducing or eliminating redundant data, the SAN's network usage can be reduced and the storage utilization of data may be improved. In the deduplication process, duplicated data (data segment signatures) are deleted, leaving a single copy of the data segment signature to be stored. The deleted data are replaced with a reference to a unique copy of the data segment signature. Deduplication may reduce required storage capacity because only the unique data are stored. Typically, the unique data are stored in a data storage associated with the computing device that performs the deduplication process. For example, a deduplication server (i.e., a server that performs data deduplication), may store the unique data in a database or other data storage mechanisms connected to or associated with the deduplication server. An inline deduplication module may perform a deduplication process before or during the data transfer as opposed to performing a deduplication process on the data after the data have been stored.

However, as with other clients putting data into the SAN, the congestion on the network can affect the deduplication module's quality of service. The deduplication module may have to wait to put deduplicated data into the SAN due to network congestion. The wait time can contribute to a backlog of data submitted to the deduplication module for deduplication.

The deduplication module may deduplicate the data based on any number of parameters. For example, the deduplication module may have an assigned deduplication rate that involves a predetermined search time in which the deduplication module will search for data segment signatures. Within the predetermined search time, the deduplication module will find as many data segment signatures as possible. At the expiration of the predetermined search time, the deduplication module will discontinue looking for additional data segment signatures even if there are additional data segment signatures remaining in the data. At the expiration of the predetermined search time, the deduplication module may put the deduplicated data onto the SAN if there is no wait time. If there is a wait time the deduplication module may send the deduplicated data at the end of the wait time to the network.

If the deduplication module concludes that the data segment signatures have been discovered in the data prior to the expiration of the predetermined search time, the deduplication module may send the deduplicated data to the SAN if there is not a wait time. On the other hand, if a wait time exists even when the deduplication module determines that each of the data segment signatures are discovered prior to the expiration of the predetermined search time, the deduplication module may still wait until the end of the wait time to send the deduplicated data.

Another parameter that may affect a deduplication rate is a deduplication count. Such a parameter may determine the number of data segment signatures that the deduplication module will find before discontinuing to look for additional data segment signatures regardless of whether other data segment signatures exist. Similar to when the deduplication module uses the predetermined search time parameter, the deduplication module can put the deduplicated data onto the SAN immediately after the data is deduplicated if there is little or no wait time. However, if there is a wait time, the deduplication module waits until the wait time expires. In such an example, the deduplication module can cease looking for data segment signatures if the deduplication module determines to end the search. Such a search end may be triggered by the deduplication module determining that no additional data segment signatures exist. However, other events may trigger the deduplication module to stop deduplicating and to put the data in the existing state into the SAN.

Such wait times can cause the deduplication module to put data onto the SAN at a slower speed than intended by the predetermined deduplication rate. In circumstances where the deduplication rate is instructing the deduplication module to put deduplicated data into the SAN at a speed faster than the congested network will allow, the deduplication rate can be adjusted. For example, the predetermined search threshold may be increased, which can increase the deduplication rate because more data segment signatures are likely to be found. For example, if the deduplication module is likely to wait ten milliseconds to send the deduplicated data to the SAN, the predetermined search time may be increased by an additional ten milliseconds. Thus, the deduplication module that would have otherwise been idle for those ten milliseconds can now be used productively to find additional data segment signatures. By using a longer predetermined search time, the amount of the data that is deduplicated may be increased, thus lowering the amount of data that is transmitted to the SAN. This may reduce the congestion on the network as well as improve the deduplication module's performance. The deduplication rate may also be adjusted for high network congestion by increasing the deduplication count, adjusting another parameter, or combinations thereof.

Likewise, if the network has no or little congestion, the deduplication rate can be decreased so that the time spent deduplicating data is lowered. This helps to balance the work load on the network by sending the data to the SAN when the network traffic is low instead of sending the data to the SAN when network traffic is high. The deduplication rate may be decreased by lowering the deduplication count or decreasing the predetermined search time. As a result, there is a greater potential that redundant data is sent to the SAN, but the deduplication data may be transferred to the SAN quicker because there is available bandwidth due to the low network congestion.

In one embodiment, the present systems and methods cause a deduplication module, which runs outside of the SAN, to adjust its deduplication rate based on network congestion. The deduplication module has an ability to respond to instructions from other devices that have information about the network's level of congestion. For example, on-premise devices may gather congestion information about the network. The on-premise device can instruct the deduplication module to have a specific deduplication rate that is appropriate for the network congestion. In this manner, the data from the on-premise device can cause the deduplication module to use the available time based on the network's conditions most effectively. For example, if the on-premise device determines that the network congestion will likely cause a wait time, the on-premise device can instruct the deduplication module to increase its deduplication rate and thereby increase the deduplication density of the data. On the other hand, if the on-premise device determines that there will be no wait time, the on-premise device can instruct the deduplication module to decrease the deduplication rate and thereby lower the deduplication density of the data.

FIG. 1 is a block diagram illustrating one embodiment of an environment 100 in which the present systems and methods may be implemented. In one embodiment, on-premise devices 102-a-1, 102-a-2, and 102-a-3 may communicate with a server 114 across a communication channel 112. In one configuration, the communication channel 112 may be a local area network (LAN). However, the communication channel 112 may be any appropriate type of mechanism that allows on-premise devices 102 to communicate with the server 114. The on-premise devices 102 may be any appropriate type of devices of an organization that is connected to that organization's network. Such on-premise devices may include, but are not limited to, personal computers (PC), laptop computers, mobile devices, smart phones, personal digital assistants (PDA), electronic tablets, and the like.

The server 114 may include a deduplication module 116. The deduplication module 116 may implement the deduplication technique to optimize the storage of data within the various files on the on-premise devices 102. For example, a signature look up module 115 of the deduplication module 116 may search the data from the on-premise devices 102 for data segment signatures that are repeated throughout the data. The data segment signatures can be replaced in the data with a pointer that points to a reference table that includes the data segment signature. As a result, the data from the on-premise devices 102 is condensed to save space without sacrificing quality of the data.

In one embodiment, the server 114 may communicate with cloud storage 120 across a network 118. The network 118 may be a wide area network (WAN), a storage area network (SAN), another type of network, or the like. The data compressed by the deduplication module 116 may be stored within cloud storage 120. The server 114 may also retrieve the data stored within cloud storage 120 in order to restore a file in its original form to the on-premise devices 102. The deduplication module 116 may compress the data and serve as a module to backup the data contained in the various files stored on the on-premise devices 102.

The on-premise devices 102 include managing modules 104-a-1, 104-a-2, and 104-a-3, which collect congestion information about the network 118. This information can be used to determine how much congestion the network 118 is experiencing. If the managing module 104 determines that the network 118 has a significant amount of congestion, the managing module 104 may instruct the deduplication module 116 to increase its deduplication rate. On the other hand, if the managing module 104 determines that the network 118 has little or no congestion, the managing module 104 can instruct the deduplication module 116 to lower its deduplication rate.

In some examples, the managing module 104 communicates with the deduplication module 116 to determine the deduplication rate. In such an example, the managing module 104 can instruct the deduplication module on how to adjust the deduplication rate with increase rate and decrease rate type commands. In other examples, the managing module 104 is unaware of the current deduplication rate. In such an example, the managing module 104 may instruct the deduplication module 116 to adjust the deduplication rate by indicating what the deduplication rate should be. Here, the deduplication module determines how much of an increase or decrease, if any, should be made to adjust the deduplication rate according to the managing module's instructions.

The deduplication module 116 may have an adjustable deduplication rate based on the deduplication module's ability to adjust a single deduplication parameter, such as the predetermined search time or the deduplication count, or an ability to adjust multiple deduplication parameters. In examples where the deduplication module 116 can adjust multiple deduplication parameters, the managing module 104 may instruct the deduplication module 116 on which deduplication parameters to change to adjust the deduplication rate. For example, the deduplication module 116 may specifically instruct the deduplication module to adjust the predetermined search time, the deduplication count, other parameters, or combinations thereof. In other examples, the managing module 104 merely instructs the deduplication module 116 to make adjustments to the overall deduplication rate and allows the deduplication module 116 to adjust the deduplication parameters as the deduplication module 116 determines.

Figure 2:
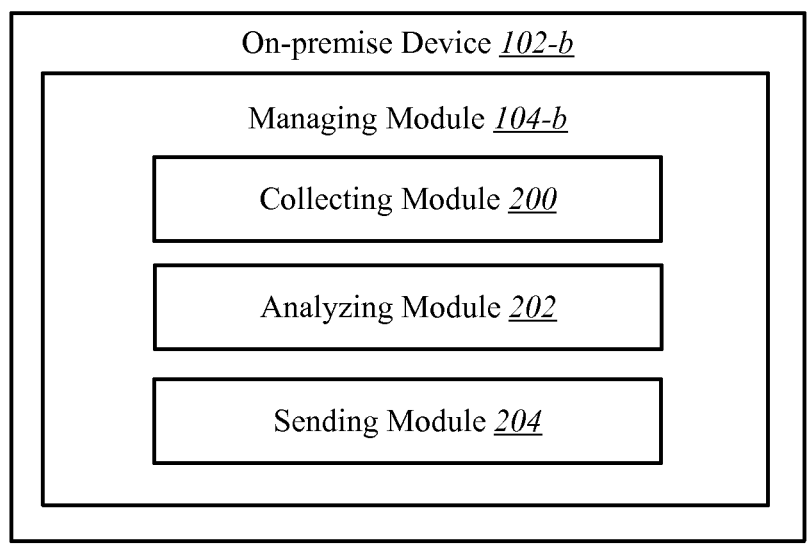
FIG. 2 is a block diagram illustrating one embodiment of an on-premise device that may implement the present systems and methods.

FIG. 2 is a block diagram illustrating one embodiment of an on-premise device 102-b. The on-premise device 102-b may be an example of the on-premise devices 102 illustrated in FIG. 1. In one configuration, the on-premise device 102-b includes a managing module 104-b. In one embodiment, the managing module 104-b may be an example of the managing module 104 illustrated in FIG. 1. The managing module 104-b includes a collecting module 200, an analyzing module 202, and a sending module 204. The collecting module 200 may collect the congestion information about the network 118. The analyzing module 202 may determine a desirable deduplication rate based on the collected congestion information. The sending module 204 may send an instruction to the deduplication module to cause the deduplication module to adjust to the desirable deduplication rate.

Each of the modules 104-b, 200, 202, 204 may include a combination of hardware and programmed instructions that are necessary for performing the designated function of the module. Components of the modules may be located on the same physical device or some of the components may be located at remote locations that are in communication with the other components of the module.

Figure 3:
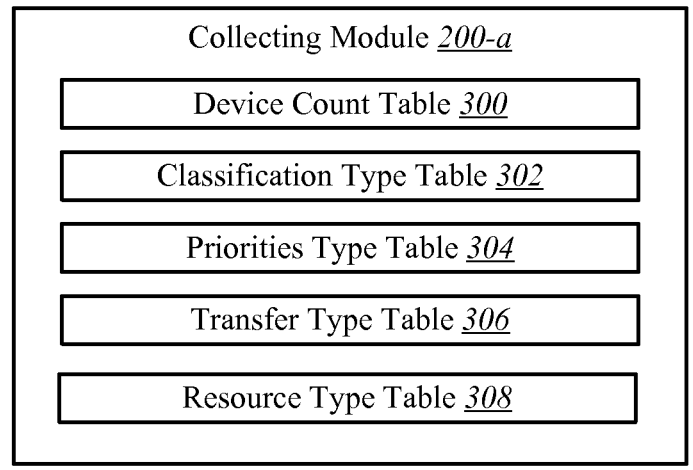
FIG. 3 is a block diagram illustrating one embodiment of a collecting module that may implement the present systems and methods.

FIG. 3 is a block diagram illustrating one embodiment of a collecting module 200-a that may implement the present systems and methods. In one example, the collecting module 200-a may be an example of the collecting module 200 illustrated in FIG. 2. The collecting module 200-a may include a device count table 300, a classification type table 302, a priorities type table 304, a transfer type table 306, and a resource type table 308.

The collecting module 200-a may collect information from other on-premise devices 102 that are sending data to the network 118. These on-premise devices 102 may be sending data to the network 118 for remote storage services or for different services. The collecting module 200-a may use the communication channel 112 to collect the data from the other on-premise devices 102.

The communication channel 112 may allow for high bandwidth/low latency communication using non-blocking communication protocols. The communication channel 112 does not utilize the network 118, which is used as a data and control mechanism for the cloud storage 120. In one such implementation, the communication channel 112 is implemented as a persisted shared memory using 32 and 64 data entries only. The communication channel 112 may allow updates to data entries may be accomplished using a compare-and-swap paradigm. This mechanism provides a communication channel 112 at the bandwidth and latency of physical memory and avoids any blocking communication primitives.

The on-premise devices 102 may communicate with each other by announcing through the communication channel 112 their presence and/or interactions with the network 118. For example, if a first on-premise device 102-*a*-1 is sending a high priority task to the deduplication module 116, the first on-premise device 102-*a*-1 may broadcast to the other on-premise devices 102-*a*-2, 102-*a*-3 the nature of the task. The other on-premise devices 102-*a*-2, 102-*a*-3 may recognize that such a task may congest the network 118 and/or the deduplication module 116. As a result, the other on-premise devices 102-*a*-2, 102-*a*-3 may instruct the deduplication module 116 to increase their deduplication rate to lower the deduplication module's processing speed. In another example, if the other on-premise devices 102-*a*-2, 102-*a*-3 announce that they are not using the network 118, then the first on-premise device 102-*a*-1 may instruct the deduplication rate to decrease the deduplication rate, which will speed the deduplication module's processing speed. In some instances, the first on-premise device 102-*a*-1 may send a message to the other on-premise devices 102-*a*-2, 102-*a*-3 to adjust the deduplication rates associated with their jobs.

In other implementation, the collecting module 200-*a* of the first on-premise device 102-*a*-1 may broadcast a signal to the other on-premise devices 102-*a*-2, 102-*a*-3 requesting information about what they are sending over the network 118 and associated details. The other on-premise devices 102-*a*-2, 102-*a*-3 may respond to the request by providing to the first on-premise device 102-*a*-1 with the requested information.

The collecting module 200-*a* may sort the collected information into the different tables 300, 302, 304, 306, 308. For example, the number of on-premise devices 102 that indicate they are sending data to the network 118 may be stored on the device count table 300. Further, the classification type table 302 may store the classifications of the devices that are contributing to traffic on the network 118. Such devices may be reading the data stored on the network 118, writing data stored on the network 118, or performing another type of function over the network 118. The classification type table 302 may classify these types of devices as writers, readers, or other types of devices. Further, the priorities type table 304 may track the priorities associated with each device. The transfer type table 306 tracks the type of transfers being performed on the network 118 by each device, such as backup transfers, restore transfers, duplication transfers, other types of transfers, or combinations thereof. The resource type table 308 tracks the type of resources used by the devices, such as memory data segment signatures, central processing unit allocations, other types of resources, or combinations thereof.

Collecting congestion information may occur before each instance that data is streamed to the deduplication module so that the managing module 104 can provide an instruction for adjusting the deduplication rate that reflects real time as close as possible. However, collecting congestion information may occur at different times or be associated with different events. For example, the collecting module 200-*a* may collect the information on a periodic basis. The collected information can be analyzed to determine patterns and other types of historical usage details. For example, the collected information may indicate that certain on-premise devices have a large job scheduled at specific times on a repeating basis. As a result, the managing module 104 can merge such information with the currently collected data to adjust the dedulication rate.

The on-premise devices 102 may make other decisions than just determining the deduplication rate for their specific jobs. If the first on-premise device 102-*a*-1 announces that it will be performing a high priority task over the deduplication module 116, the other on-premise devices 102-*a*-2, 102-*a*-3 may delay their jobs that involve the deduplication module 116. The on-premise devices 102 may collectively determine how to share the deduplication module 116 according to the details of their jobs. By coordinating their usage of the deduplication module 116, the on-premise devices 102 can prevent the network from becoming overloaded based on the deduplication module's load.

Figure 4:
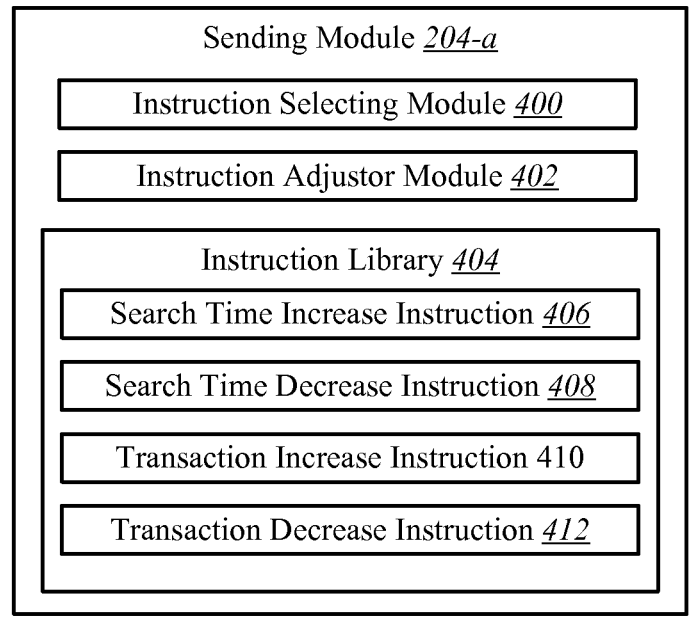
FIG. 4 is a block diagram illustrating one embodiment of a sending module that may implement the present systems and methods.

FIG. 4 is a block diagram illustrating one embodiment of a sending module 204-*a* that may implement the present systems and methods. The sending module 204-*a* may be an example of the sending module 204 illustrated in FIG. 2. In this example, the sending module 204-*a* includes an instruction selecting module 400, an instruction adjustor module 402, and an instruction library 404. The instruction library 404 includes a search time increase instruction 406, a search time decrease instruction 408, a transaction increase instruction 410, and a transaction decrease instruction 412.

The sending module 204-*a* may receive the analysis from the collecting module 200 about adjusting the deduplication rate. An instruction selecting module 400 may select an instruction from the instruction library 404, which contains prewritten instructions 406, 408, 410, 412. Each instruction 406, 408, 410, 412 may have an exact increase or decrease increment for adjusting the deduplication rate. The instruction adjustor module 402 has the ability to modify the prewritten instructions 406, 408, 410, 412 as desired based on the analysis from the collecting module 200. Thus, if one of the prewritten instructions 406, 408, 410, 412 falls outside of the range that managing module 104 desires to adjust the deduplication rate, the instruction adjustor module 402 can make the appropriate changes. While this example has been described with specific instructions, the principles described in the present disclosure foresee any appropriate type of instructions for causing the deduplication module to change the deduplication rate.

Figure 5:
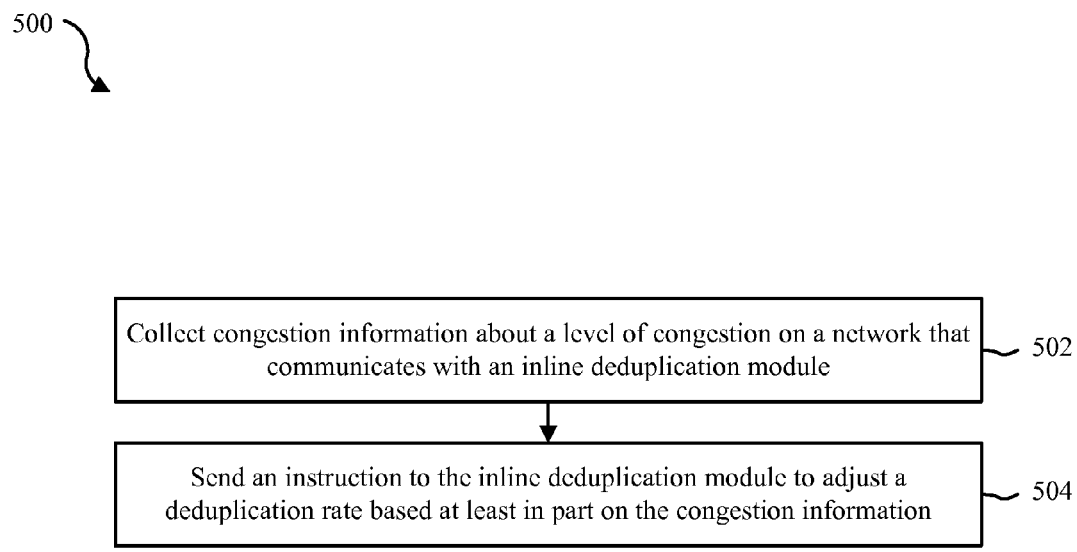
FIG. 5 is a flow diagram illustrating one embodiment of a method for managing a deduplication module according to the present disclosure.

FIG. 5 is a flow diagram illustrating one embodiment of a method 500 for managing a deduplication module according to the present disclosure. In this example, the method 500 includes collecting 502 congestion information about a level of congestion on a network that communicates with an inline deduplication module. The managing module 104 may implement this method 500.

Often, deduplication modules configured to support extreme amounts of storage are not deterministic, but rather these types of deduplication modules make assumptions based on the behavior patterns of the input data. In one such an implementation, the data segment signature lookup module of the deduplication module assumes stream locality within the input data and uses a metabase implementation that is built around this assumption. In some examples, when the deduplication module is searching for a specific data segment signature, the search is terminated before the deduplication module has finished executing a search procedure for the data segment signature. The search termination can be triggered based on time passed, on transaction counts internal to the lookup module, or on another trigger event.

This type of data segment signature lookup module where the deduplication module can cut short a search procedure is well suited for inline deduplication where high throughput performance is desired. Further, the adjustment of such trigger events, such as adjusting the time for searching or adjusting the number of transaction counts allows for a mechanism to adjust the deduplication rate.

The principles described in the present disclosure allow for the deduplication rate to be adjusted so that that network congestion is reduced or avoided. In one implementation, the managing module executes the method by obtaining information about the effectiveness of the network utilization from each device that is pushing data to the network on an individual basis. If one of the devices pushing data to the network is spending a large amount of time waiting for the data to be pushed to the network, this time might as well be used searching for more data segment signatures in the data stream by increasing the deduplication rate. The deduplication module will be informed by the managing module of the on-premise device's wait time. The deduplication module will use that additional time to search for data segment signatures. Such a feedback loop can repeat while data is being sent to the network. On the other hand, if the data is streaming through the deduplication module without any wait time due to unrelated traffic, the deduplication rates can be decreased to take advantage of the available bandwidth of the network.

In another implementation, the on-premise devices gather information via a high performance/non-blocking communication channel. Such congestion information may include just the number of network connections used by each individual on-premise device. A simple count of such connections can be tracked through the communication channel. During the data transfer phase, each on-premise device monitors this count. If the count is high, the managing modules of the on-premise devices can instruct the deduplication module to be more aggressive. In response to such an instruction, the deduplication module will use additional time to search for data segment signatures. On the other hand, if the count is low, the managing modules of the on-premise devices can instruct the deduplication module to be less aggressive. As a result, the deduplication module will use less time to search for data segment signatures.

Figure 6:
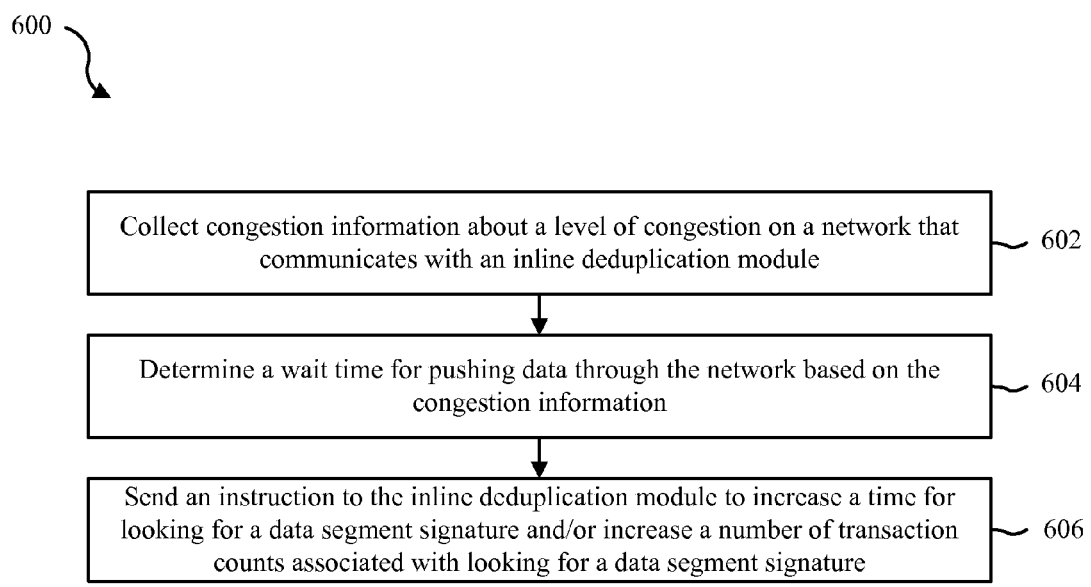
FIG. 6 is a flow diagram illustrating one embodiment of a method for managing a deduplication module according to the present disclosure.

FIG. 6 is a flow diagram illustrating one embodiment of a method 600 for managing a deduplication module according to the present disclosure. In this example, the method 600 includes collecting 602 congestion information about a level of congestion on a network that communicates with an inline deduplication module, determining 604 a wait time for pushing data through the network based on the congestion information, and sending 606 an instruction to the inline deduplication module to increase a time for looking for a data segment signature and/or increase a number of transaction counts associated with looking for a data segment signature. The managing module 104 may implement this method 600.

In this example, the managing module determines that a wait time exists for pushing the data into the network. The information collected by the collecting module may be collected from other devices pushing data onto the network. In alternative examples, the managing module analyzes parameters about the congestion directly from the network or the managing module uses another type of mechanism for gathering congestion information.

By sending an instruction to the deduplication module to increase the deduplication rate, the data to be stored in the cloud storage device will have a higher density of deduplicated data, which can save on costs associated with storing larger amounts of data. Further, the higher density of deduplicated data will result in a smaller amount of data being pushed onto the network. As a result, the higher deduplicated data density will have a lower impact on the network's congestion.

Figure 7:
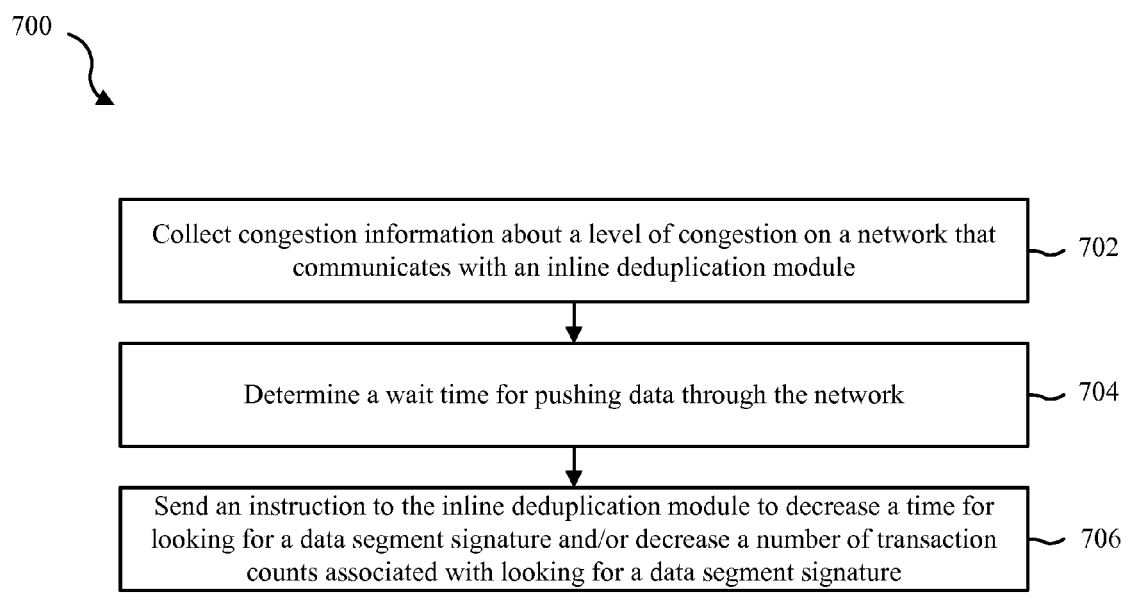
FIG. 7 is a flow diagram illustrating one embodiment of a method for managing a deduplication module according to the present disclosure.

FIG. 7 is a flow diagram illustrating one embodiment of a method 700 for managing a deduplication module according to the present disclosure. In this example, the method 700 includes collecting 702 congestion information about a level of congestion on a network that communicates with an inline deduplication module, determining 704 a wait time for pushing data through the network based on the congestion information, and sending 706 an instruction to the inline deduplication module to decrease a time for looking for a data segment signature and/or decrease a number of transaction counts associated with looking for a data segment signature. The managing module 104 may implement this method 700.

By sending an instruction to the deduplication module to decrease the deduplication rate, the data to be stored in the cloud storage device will have a lower density of deduplicated data. However, the processing time for deduplicating and transferring the data from the on-premise device to the cloud storage device will be reduced. This scenario is well suited for applications that benefit from a high performance output of deduplication data. Further, network congestion is also avoided because the larger amount of data resulting from a lower deduplication rate is pushed onto the network at a time when the network has available bandwidth. Additionally, this data can be processed before the network becomes congested.

Figure 8:
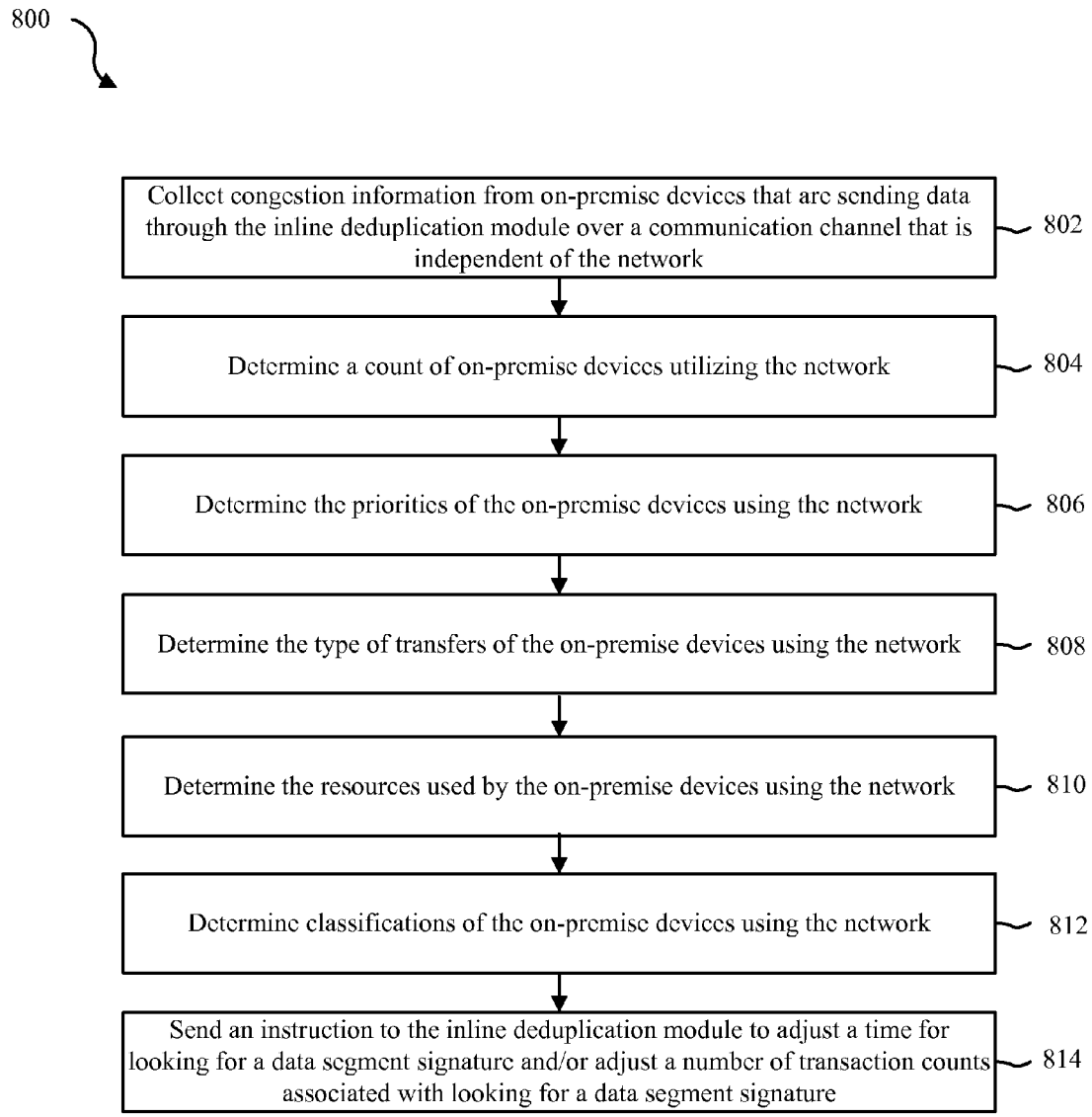
FIG. 8 is a flow diagram illustrating one embodiment of a method for managing a deduplication module according to the present disclosure.

FIG. 8 is a flow diagram illustrating one embodiment of a method 800 for managing a deduplication module according to the present disclosure. In this example, the method 800 includes collecting 802 congestion information from on-premise devices that are sending data through the inline deduplication module over a communication channel that is independent of the network, determining 804 a count of on-premise devices utilizing the network, determining 806 the priorities of the on-premise devices using the network, determining 808 the type of transfers of the on-premise devices using the network, determining 810 the resources used by the on-premise devices using the network, determining 812 classifications of the on-premise devices using the network, and sending 814 an instruction to the inline deduplication module to adjust a time for looking for a data segment signature and/or adjust a number of transaction counts associated with looking for a data segment signature. The managing module 104 may implement this method 800.

Each of the types of congestion information collected about network congestion, such as device counts, priorities, transfer types, resource types, classifications, and other types of congestion information can be used to determine a likely wait time that data sent through the deduplication module will have to wait before being pushed onto the network or otherwise determine a desired deduplication rate. In some examples, just a subset of these types of congestion information is used as a basis for determining a desired deduplication rate. For example, the managing module may determine a desired deduplication rate based on just the device count. In other examples, the managing module uses just two or another selected number of the above listed types of congestion information to determine a desired deduplication rate. In yet other examples, other types of congestion information are used to determine a desired deduplication rate, such as historical information, congestion information from other sources than the on-premise devices, other types of congestion information, and combinations thereof.

Figure 9:
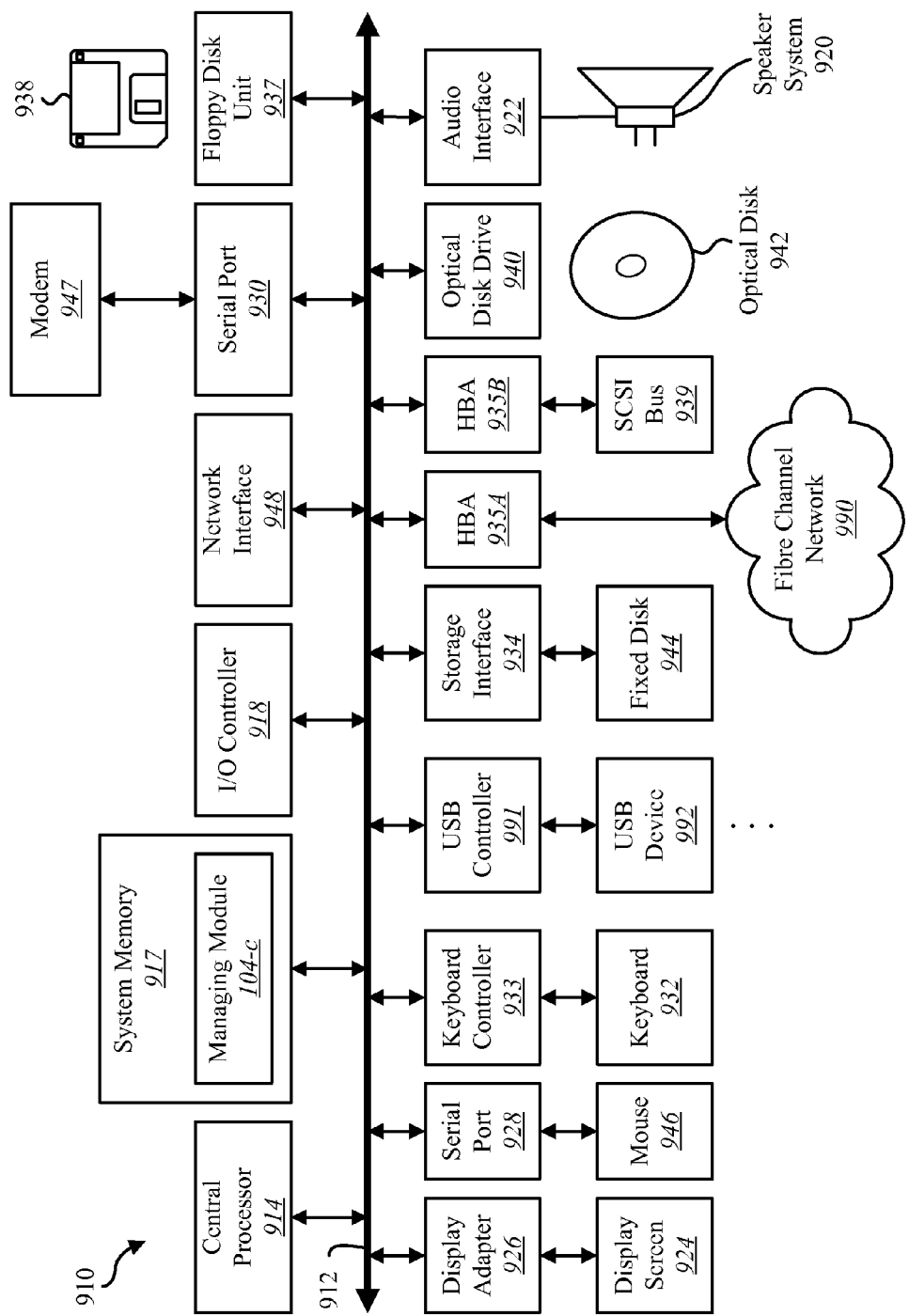
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 990), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a managing module 104-c to implement the present systems and methods may be stored within the system memory 917. The managing module 104-c may be an example of the managing module 104 illustrated in FIGS. 1 and/or 2. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
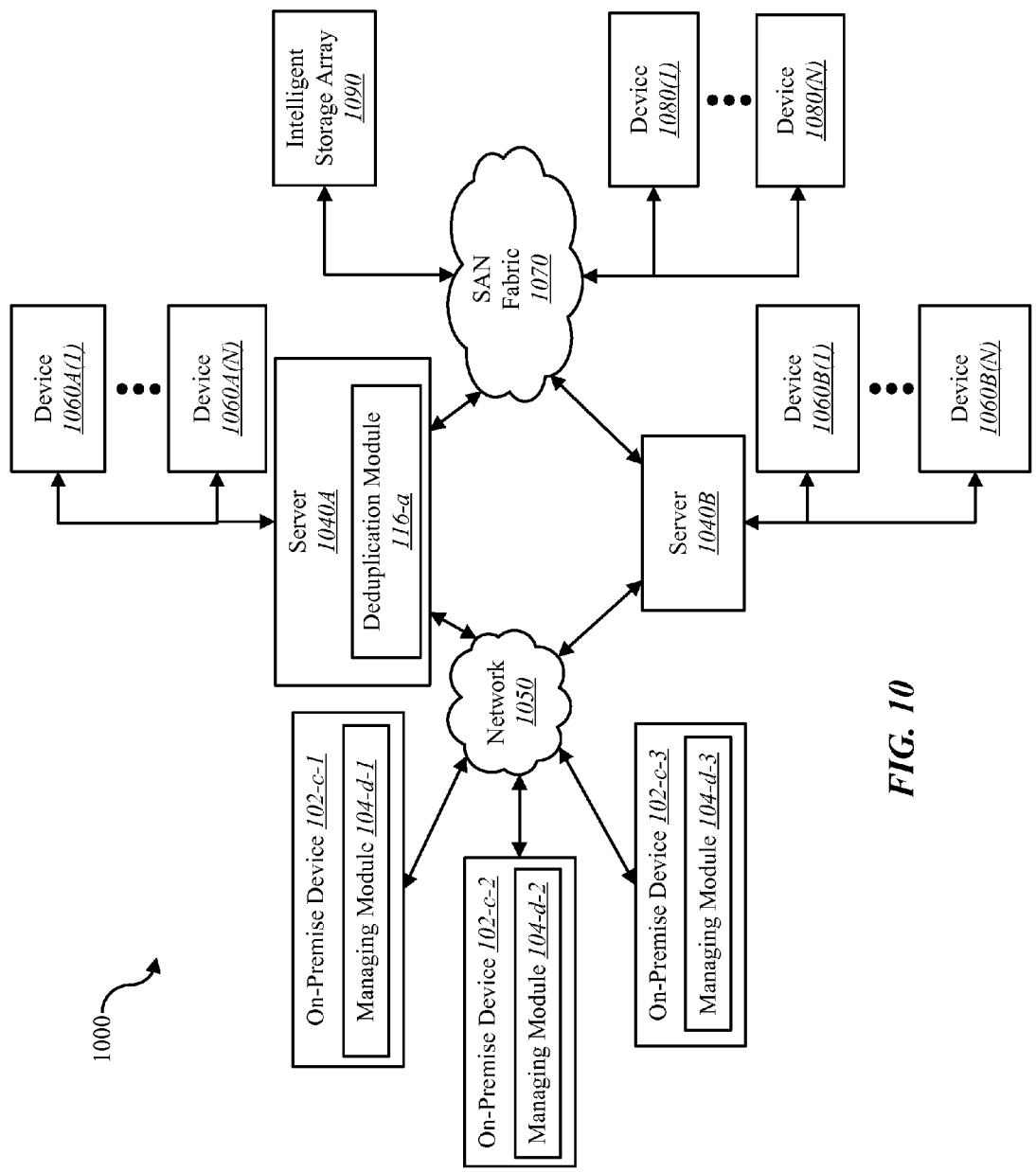
FIG. 10 is a block diagram depicting a network architecture in which client systems, as well as storage servers (any of which can be implemented using computer system), are coupled to a network.

FIG. 10 is a block diagram depicting a network architecture 1000 in which on-premise devices 102-c-1, 102-c-2, and 102-c-3, as well as storage servers 1040A and 1040B (any of which can be implemented using computer system 1010), are coupled to a network 1050. The on-premise devices 102-c may be examples of the devices 102 illustrated in FIGS. 1 and/or 2. In one embodiment, the devices 102-c may each include a managing module 104-d-1, 104-d-2, and 104-d-3. The managing modules 104-d may be examples of the managing modules 104 illustrated in FIGS. 1, 2, and/or 9. The modules 104-c may be in communication with a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A and 1040B, and so by on-premise devices 102 via network 1050. Intelligent storage array 1090 is also shown as an example of a specific storage device accessible via SAN fabric 1070. In one configuration, the server 1040A may include a deduplication module 116-a, which may be an example of the deduplication module 116 illustrated in FIG. 1.

With reference to computer system 910, modem 947, network interface 948 or some other method can be used to provide connectivity from each of on-premise devices 102 to network 1050. On-premise devices are able to access information on storage server 1040A or 1040B using, for example, a web browser or other client software (not shown). Such a client allows on-premise devices to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing an inline deduplication module, comprising:
   collecting congestion information about a level of congestion experienced by one or more external computing devices when sending data on a network, wherein the network communicates with the inline deduplication module;
   determining from the collected congestion information a wait time before the inline deduplication module is able to send deduplicated data over the network due to the level of congestion on the network experienced by the one or more external computing devices;
   sending an instruction to the inline deduplication module to adjust a deduplication rate based at least in part on the determined wait time;
   wherein the instruction includes a command for the inline deduplication module to increase a search time of an existing process to look for a data segment signature when the determined wait time indicates a delay; and
   wherein the instruction includes a command for the inline deduplication module to decrease a search time of the existing process to look for a data segment signature when the determined wait time indicates no delay.

2. The method of claim 1, wherein the instruction includes a command for the inline deduplication module to decrease a number of transaction counts associated with looking for a data segment signature.

3. The method of claim 1, wherein the instruction includes a command for the inline deduplication module to increase a number of transaction counts associated with looking for a data segment signature.

4. The method of claim 1, wherein collecting the congestion information about the level of congestion comprises:
   collecting the congestion information from on-premise devices that are sending data through the inline deduplication module over a communication channel.

5. The method of claim 4, wherein the communication channel is independent of the network.

6. The method of claim 1, wherein the network is a cloud based storage network.

7. The method of claim 1, wherein the congestion information includes at least one of a count of on-premise devices utilizing the network, classifications of on-premise devices using the network, priorities, types of transfers, and types of resources used.

8. A computing device configured for managing an inline deduplication module, comprising:
   a processor;
   memory in electronic communication with the processor; and
   instructions stored in the memory, the instructions being executable by the processor to:
   collect congestion information about a level of congestion experienced by one or more external computing devices when sending data on a network, wherein the network communicates with the inline deduplication module;
   determine from the collected congestion information a wait time before the inline deduplication module is able to send deduplicated data over the network due to the level of congestion on the network experienced by the one or more external computing devices;
   send an instruction to the inline deduplication module to adjust a deduplication rate based at least in part on the determined wait time;
   wherein the instruction includes a command for the inline deduplication module to increase a search time of an existing process to look for a data segment signature when the determined wait time indicates a delay; and
   wherein the instruction includes a command for the inline deduplication module to decrease a search time of the existing process to look for a data segment signature when the determined wait time indicates no delay.

9. The computing device of claim 8, wherein the instruction includes a command for the inline deduplication module to adjust a number of transaction counts associated with looking for a data segment signature.

10. The computing device of claim 8, wherein the instructions are further executable by the processor to collect the congestion information from on-premise devices that are sending data through the inline deduplication module over a communication channel.

11. The computing device of claim 10, wherein the communication channel is independent of the network.

12. The computing device of claim 8, wherein the network is a cloud based storage network.

13. The computing device of claim 8, wherein the congestion information includes at least one of a count of on-premise devices utilizing the network, classifications of on-premise devices using the network, priorities, types of transfers, and types of resources used.

14. A computer-program product for managing an inline deduplication module, the computer-program product comprising a non-transitory computer-readable medium having instructions thereon, the instructions being executable by a processor to:

collect congestion information about a level of congestion experienced by one or more external computing devices when sending data on a network, wherein the network communicates with the inline deduplication module;

determine from the collected congestion information a wait time before the inline deduplication module is able to send deduplicated data over the network due to the level of congestion on the network experienced by the one or more external computing devices;

send an instruction to the inline deduplication module to adjust a deduplication rate based at least in part on the determined wait time;

wherein the instruction includes a command for the inline deduplication module to increase a search time of an existing process to look for a data segment signature when the determined wait time indicates a delay; and wherein the instruction includes a command for the inline deduplication module to decrease a search time of the existing process to look for a data segment signature when the determined wait time indicates no delay.

15. The computer-program product of claim 14, wherein the instruction includes a command for the inline deduplication module to adjust a number of transaction counts associated with looking for a data segment signature.

* * * * *